No. 721,910. PATENTED MAR. 3, 1903.
J. B. OLSEN.
PUZZLE.
APPLICATION FILED SEPT. 15, 1902.
NO MODEL.

Witnesses.
C. H. Keenig
Anna O. Faust

Inventor.
John B. Olsen
By Benedict, Morsell & Green
Attorneys.

UNITED STATES PATENT OFFICE.

JOHN B. OLSEN, OF MILWAUKEE, WISCONSIN.

PUZZLE.

SPECIFICATION forming part of Letters Patent No. 721,910, dated March 3, 1903.

Application filed September 15, 1902. Serial No. 123,375. (No model.)

*To all whom it may concern:*

Be it known that I, JOHN B. OLSEN, residing at Milwaukee, in the county of Milwaukee and State of Wisconsin, have invented a new and useful Improvement in Puzzles, of which the following is a description, reference being had to the accompanying drawings, which are a part of this specification.

My invention has relation to improvements in puzzles; and it consists in the devices and parts or their equivalents, as hereinafter more fully set forth.

Figure 1:
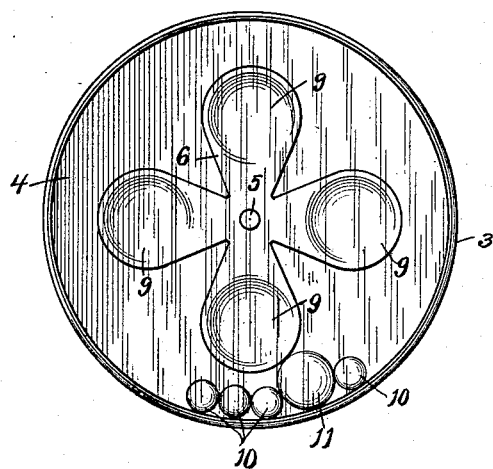
Figure 2:
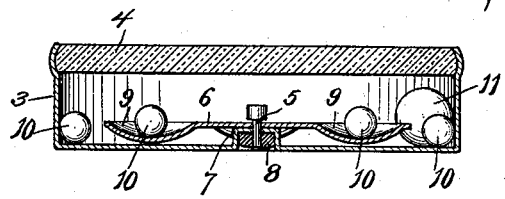

In the accompanying drawings, Figure 1 is a plan view of the improved puzzle, and Fig. 2 is a central vertical sectional view thereof.

Referring to the drawings, the numeral 3 indicates a casing, the top of which is covered by a cover 4 of glass or other transparent material. Extending up from the center of the bottom of the casing is a pivot-pin 5, and mounted on this pin is a revoluble device 6. This revoluble device is supported on the pin at a point sufficiently high to enable said device in its revolution to clear the bottom of the casing. To accomplish this, I preferably force the bottom of the casing upwardly at a central point to form a seat 7, on which the revoluble device is supported and revolves. In the cavity or recess formed by the forcing inwardly of the bottom of the casing I pour solder 8, which serves to hold the pivot-pin in place. The upper end of the pivot-pin is enlarged or upset to prevent the revoluble device from working upwardly off of said pin. The revoluble device, near its outer edge or edges, is provided with a series of cavities or cup-shaped recesses 9. Any desired number of these recesses may be employed. In practice, however, I find that four of said recesses or cavities are desirable, and I have therefore illustrated that number in the accompanying drawings. The revoluble device may be of any desired shape—as, for instance, circular in form—or it may consist of a plurality of radiating arms, each arm provided at its outer end with one of the recesses or cavities. This latter construction I have illustrated in the accompanying drawings and have also shown the arms as gradually enlarging toward their outer ends and rounded at their outer end edges to give the revoluble device the appearance of a four-leaf clover.

Within the casing are a number of small balls 10. The number of these balls should preferably correspond to the number of cavities or recesses in the revoluble device, and hence in the accompanying drawings I have shown four of such small balls. A larger ball 11 may also be placed in the casing, although this larger ball may be omitted without departing from the spirit and scope of my invention.

The object of the invention is to cause the small balls to be jumped from the bottom of the casing onto the revoluble device and into the cavities or recesses of said device, so that one ball only will be in each recess. The first ball may be readily caused to be jumped onto the revoluble device and into one of the pockets or recesses thereof merely by shaking the casing. After this and in order to place the remaining balls into the cavities it is essential that one of the small balls should be brought in line with one of the other cavities. By then tapping the edge of the casing with the finger this ball can be jumped into said cavity without displacing the other ball. In like manner all the remaining small balls may be jumped into the cavities. The large ball 11 is advantageously employed, inasmuch as it enhances to a considerable extent the difficulty of causing the small balls to be jumped into the cavities. Also, where this large ball is used, after all the small balls have been placed in the cavities the larger ball can be made to run into the space between two of the radiating arms of the revoluble device, and this will cause said revoluble device to be rapidly revolved, and thereby add to the attractiveness of the puzzle. As stated, however, the larger ball can be omitted without departing from the spirit and scope of my invention.

What I claim as my invention is—

1. In a puzzle, the combination of a casing, a transparent cover for the top of the casing, a device mounted revolubly in the casing, said revoluble device provided with a plurality of cavities or recesses, and a plurality of balls within the casing, and adapted to be jumped into engagement with the cavities or recesses.

2. In a puzzle, the combination of a casing having its bottom provided with an inwardly-bent portion forming a supporting-seat, a pivot-pin projecting from said seat, a transparent cover for the top of the casing, a revoluble device mounted on the pivot-pin and supported by the seat, said revoluble device provided with a plurality of cavities or recesses, and a plurality of balls within the casing and adapted to be jumped into engagement with the cavities or recesses.

3. In a puzzle, the combination of a casing, a transparent cover for the top of the casing, a device mounted revolubly in the casing, said revoluble device provided with a plurality of cavities or recesses, a plurality of balls within the casing and adapted to be jumped into engagement with the cavities or recesses, and a larger ball also within the casing.

4. In a puzzle, the combination of a casing, a transparent cover for the top of the casing, a device mounted revolubly in the casing, said device consisting of a plurality of radiating arms, each arm provided with a cavity or recess, and a plurality of balls within the casing, and adapted to be jumped into engagement with the cavities or recesses.

5. In a puzzle, the combination of a casing, a transparent cover for the top of the casing, a device mounted revolubly in the casing, said device consisting of a plurality of radiating arms, each arm provided with a cavity or recess, a plurality of balls within the casing and adapted to be jumped into engagement with the cavities or recesses, and a larger ball also within the casing.

In testimony whereof I affix my signature in presence of two witnesses.

JOHN B. OLSEN.

Witnesses:
 A. L. MORSELL,
 ANNA V. FAUST.